United States Patent [19]

Gaughan

[11] Patent Number: 5,232,251
[45] Date of Patent: Aug. 3, 1993

[54] EXPANSION JOINT WITH TWO SEALING ELEMENTS

[76] Inventor: John T. Gaughan, Box 4131 Three Lakes Dr., Long Grove, Ill. 60047

[21] Appl. No.: 671,088

[22] Filed: Mar. 18, 1991

[51] Int. Cl.$^5$ ............................................. F16L 35/00
[52] U.S. Cl. .................................... 285/93; 285/301; 285/337; 285/422; 285/910
[58] Field of Search ................. 285/294, 300, 301, 93, 285/422, 302, 910

[56] References Cited

U.S. PATENT DOCUMENTS

| | | | |
|---|---|---|---|
| 982,836 | 1/1911 | Ley et al. | 285/302 |
| 1,873,703 | 8/1932 | Giesler | 285/300 |
| 1,968,715 | 7/1934 | Slade | 285/300 |
| 2,044,430 | 6/1936 | Hall | 285/300 |
| 3,053,554 | 9/1962 | Magos et al. | 285/93 X |
| 3,232,640 | 2/1966 | Donkle | 285/93 |
| 4,046,407 | 9/1977 | Porreco . | |
| 4,448,449 | 5/1984 | Halling et al. | 285/910 X |
| 4,511,162 | 4/1985 | Broyles . | |
| 4,679,828 | 7/1987 | Bernardot | 285/422 X |

FOREIGN PATENT DOCUMENTS

| | | | |
|---|---|---|---|
| 663030 | 5/1963 | Canada | 285/300 |
| 1580462 | 9/1969 | France | 285/300 |
| 2272324 | 12/1975 | France | 285/299 |

*Primary Examiner*—Dave W. Arola

[57] ABSTRACT

This invention provides an expansion joint that uses a flexible sealing element in conjunction with a packed seal in a manner that allows a reduction in break-away forces and permits continued operation of the joint after a failure of the bellows or bellows attachment point. The expansion arrangement includes a flexible sealing element, usually in form of a bellows, and a containment chamber in communication with the exterior portion of the flexible sealing element or bellows and an interior portion of the packed seal. The containment chamber has an opening that permits relative movement between the ends of the expansion joint and is sealed by the packed seal. In the event of a bellows failure, the packing material acts to restrict or prevent leakage from the containment chamber to the outside environment. Thus, in normal operation the flexible sealing element provides a leakproof seal and the packing serves as a backup seal which will in all cases restrict leakage from the bellow to the outside environment and, depending on the amount of force initially applied to the packing, can stop any leakage from the bellow as soon as failure occurs. After failure of the sealing element the packed seal alone can provide the necessary sealing of the joint and allow servicing of the joint to be deferred to a more convenient time.

12 Claims, 2 Drawing Sheets

EXPANSION JOINT WITH TWO SEALING ELEMENTS

BACKGROUND OF THE INVENTION

1. Field of the Invention

This invention relates generally to expansion joints for piping systems. More specifically this invention relates to expansion joints having multiple sealing elements that allow relative movement between ends of the expansion joint.

2. Description of the Prior Art

Piping systems routinely expand and contract in response to changes in temperature, internal or external loadings and anchor movements. Many piping systems incorporate expansion joints that accommodate the expansion and contraction of the piping system by permitting relative movement between segments of the piping system. Common types of expansion joints include bellow type expansion joints and packed type expansion joints.

Packed type expansion joints consist of two overlapping pipe sections and packing material that fills the gap between the two pipe sections and provides a seal between the internal and external environments of the piping system. In most packing arrangements a flared section at the end of the overlapping pipe receives the packing material and a ring or collar urges the packing into the flared opening to provide the seal. At times, a packed joint can provide a good seal with only a relatively small compressive force. However, due to irregularities in the pipe, packing and compressive force application, a substantial compressive force is needed to provide a good seal. Thus, the ring ordinarily places relatively high compressive loads on the packing material. These high compressive loads create a high resistance to relative movement between the overlapping pipe sections. This high resistance, usually referred to as break-away force, can impose large forces on the piping system as it expands and contracts.

Another type of expansion joint uses a flexible sealing element, usually in the form of a bellows, to permit relative movement between pipe segments. When displaced, a bellow acts somewhat like a low k-factor (spring rate) spring and, together with any pressure loading from the piping, imposes a relatively constant force on the attached piping elements. The constant force associated with the bellows type expansion joint is usually much less than the break away force of a packed type expansion joint.

A bellow type expansion joint can be arranged such that the piping system pressure acts on the inside or outside of the bellows. U.S. Pat. No. 4,046,407 depicts a system where the piping system pressure acts on the outside of the bellows.

In order to function the bellow must have a relatively thin wall in relation to the piping system. Thin bellows are susceptible to stress corrosion or chemical attack. This thin wall makes the bellows a weak link in the piping system that can rapidly and catastrophically fail. Apart from rendering the piping system inoperative, catastrophic bellows failures can impose serious safety hazards. Bellows failures in high temperature piping systems or confined piping areas, such as steam pipe tunnels, are especially dangerous.

As a safeguard against bellows failure, some expansion joints provide double bellows elements that operate in parallel. In such arrangements the expansion joint employs two independent bellows usually having the same ply thickness which is sized to withstand the total pressure loading of the system. Such an arrangement is shown in U.S. Pat. No. 4,511,162 issued to Broyles. In the Broyles patent, two independent bellows straddle a space between the pipe ends of the expansion joint. Broyles also provides a pressure tap to monitor the pressure in the gap between the bellows and thereby sense if a leak has developed in the bellows.

Although the double element expansion joint offers some protection against catastrophic bellows failure, the protection in many cases may not be substantial. Metal fatigue causes many bellows failures. A parallel arrangement for a double bellows expansion joint exposes both of the expansion joint elements to the same number and type of fatigue cycles. Therefore, both bellows elements approach fatigue failure at about the same time. If both bellows elements do not fail at the same time a catastrophic failure is happily avoided. Nevertheless, the failure of one bellows signals imminent failure of the other bellows and prudence dictates a shutdown of the system for replacement of both expansion joint bellows. Consequently, the failure of a single bellows ply in a double bellows expansion joint can still burden the piping system operator with an inopportune system shutdown. Moreover, many bellows failures occur at the point where the bellows attach to the pipe elements — a double element expansion joint provides no protection against failure of an expansion joint at the bellows to pipe attachment point which is generally the point of highest stress.

Therefore, expansion joint elements have posed the problem of high displacement forces, in the case of packed joints or, in the case of bellows type expansion joints, the hazard of catastrophic failure or the inconvenience of unplanned shutdowns.

BRIEF SUMMARY OF THE INVENTION

It is an object of this invention to eliminate weak elements from piping systems.

It is further object of this invention to provide an expansion joint that reduces the loading on pipe segments in piping systems which is not subject to catastrophic failures or inconvenient shutdowns.

It is a yet further object of this invention to provide a bellows type expansion joint that is not rendered inoperable by failures of the pipe to bellows attachment point.

This invention provides an expansion joint that uses a flexible sealing element in conjunction with a packed seal in a manner that allows a reduction in break-away forces and permits continued operation of the joint after a failure of the bellows or bellows attachment point. The expansion arrangement includes a flexible sealing element, usually in form of a bellows, and a containment chamber in communication with the exterior portion of the flexible sealing element or bellows and an interior portion of the packed seal. The containment chamber has an opening that permits relative movement between the ends of the expansion joint and is sealed by the packed seal. In the event of a bellows failure, the packing material acts to restrict or prevent leakage from the containment chamber to the outside environment. Thus, in normal operation, the flexible sealing element provides a leakproof seal and the packing serves as a backup seal which will in all cases restrict leakage from the bellow to the outside environment and, depending on the amount of force initially applied to the packing, can stop any leakage from the bellow as soon as failure occurs. After failure of the sealing element the packed seal alone can provide the necessary sealing of the joint and allow servicing of the joint to be deferred to a more convenient time. As a result the expansion joint provides the catastrophic failure protection of a packed joint without its high break-away force or minor leakage problems.

Accordingly, in one embodiment this invention is an expansion joint that comprises a first conduit extending from a first end of the joint and a second conduit longitudinally aligned with the first conduit, extending from a second end of the joint, and having an overlapping portion that surrounds the first conduit to form an annular opening between the first conduit and the second conduit. The expansion joint includes a flexible sealing element having a first end fixed to the first conduit and a second end fixed to the second conduit. The expansion joint also uses means for sealing the annular opening which permits relative movement between the first conduit and the second conduit.

In another embodiment this invention is an expansion joint comprising a first conduit extending from a first end of the joint and a second conduit longitudinally aligned with the first conduit, extending from a second end of the joint, and having an overlapping portion that surrounds the first conduit to form an annular opening between the first conduit and the second conduit. The expansion joint includes a flexible sealing element having a first end proximate the first end of the joint and a second end proximate the second end of the joint, wherein the first end of the sealing element is fixed to the second conduit and the second end of the sealing element is fixed to the first conduit. In addition the expansion joint includes means for sealing the annular opening that permits relative movement between the first conduit and the second conduit.

In a more limited embodiment this invention is an expansion joint for piping systems having a protected bellows element. The joint comprises:

a first conduit extending from a first end of the joint;

a second conduit coaxially aligned with the first conduit and extending from a second end of the joint;

an external sleeve fixed to the second conduit and surrounding the first conduit, the sleeve having a first section and a second section wherein the first section has a larger diameter than the second section;

a corrugated bellows located in an annular space between the first section of the external sleeve and the first conduit and having a first end proximate the first end of the joint and a second end proximate the second end of the joint, wherein the second end of the bellows is fixed to the first conduit and the first end of the bellows is fixed to the sleeve;

a chamber defined at least in part by the inner surface of the bellows, the outside of the first conduit and the inside of the second section of the sleeve; and, packing material inserted between the end of the second section of the sleeve and the first conduit and a collar for urging the packing toward the sleeve to seal the chamber.

Other aspects, embodiments, and details of this invention are presented in the following detailed description of the invention.

BRIEF DESCRIPTION OF THE INVENTION

DETAILED DESCRIPTION OF THE INVENTION

Figure 1:
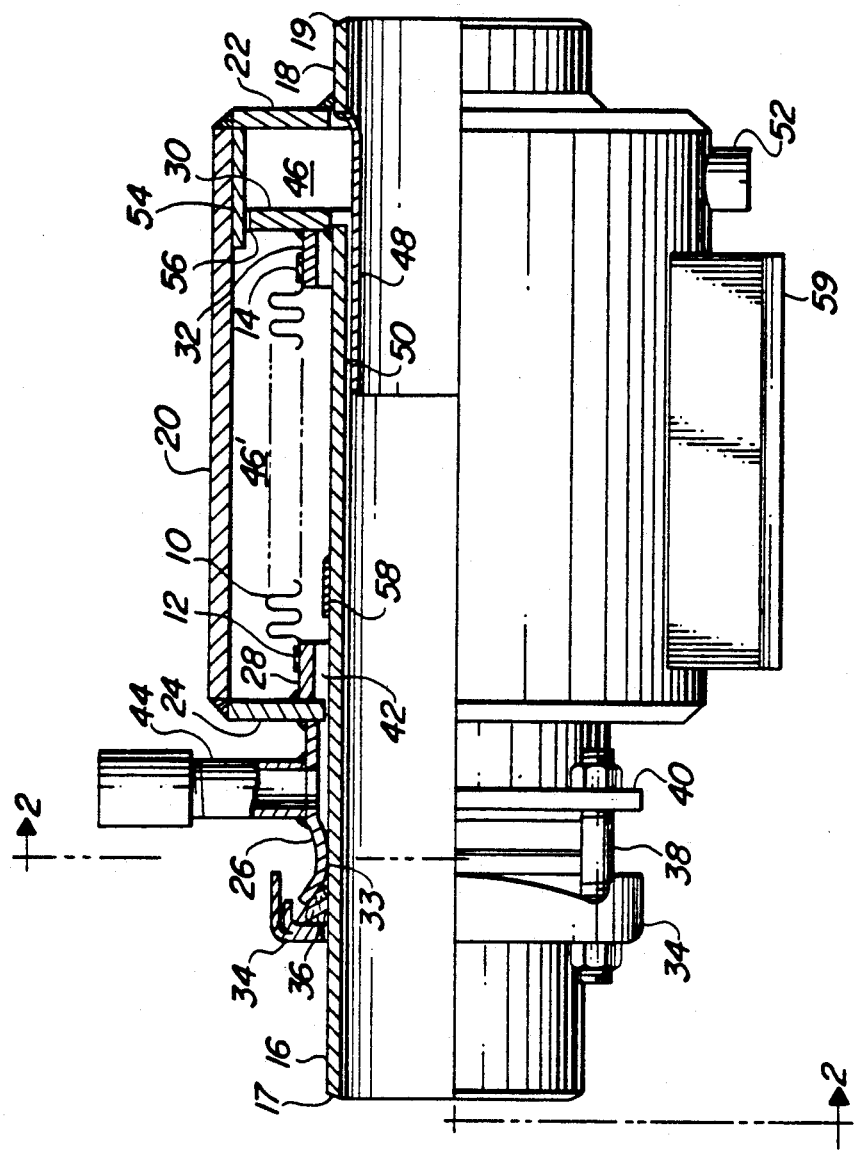
FIG. 1 is a split section view of the expansion joint of this invention.
Figure 2:
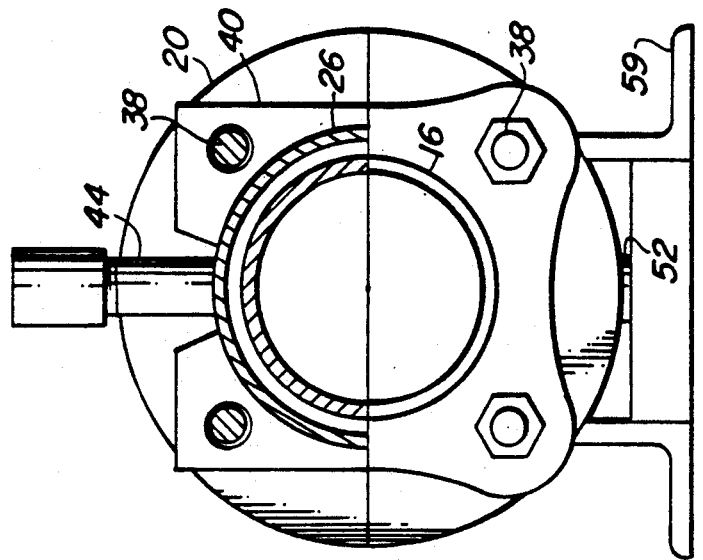
FIG. 2 is a split section side view of the expansion joint of FIG. 1.
Figure 3:
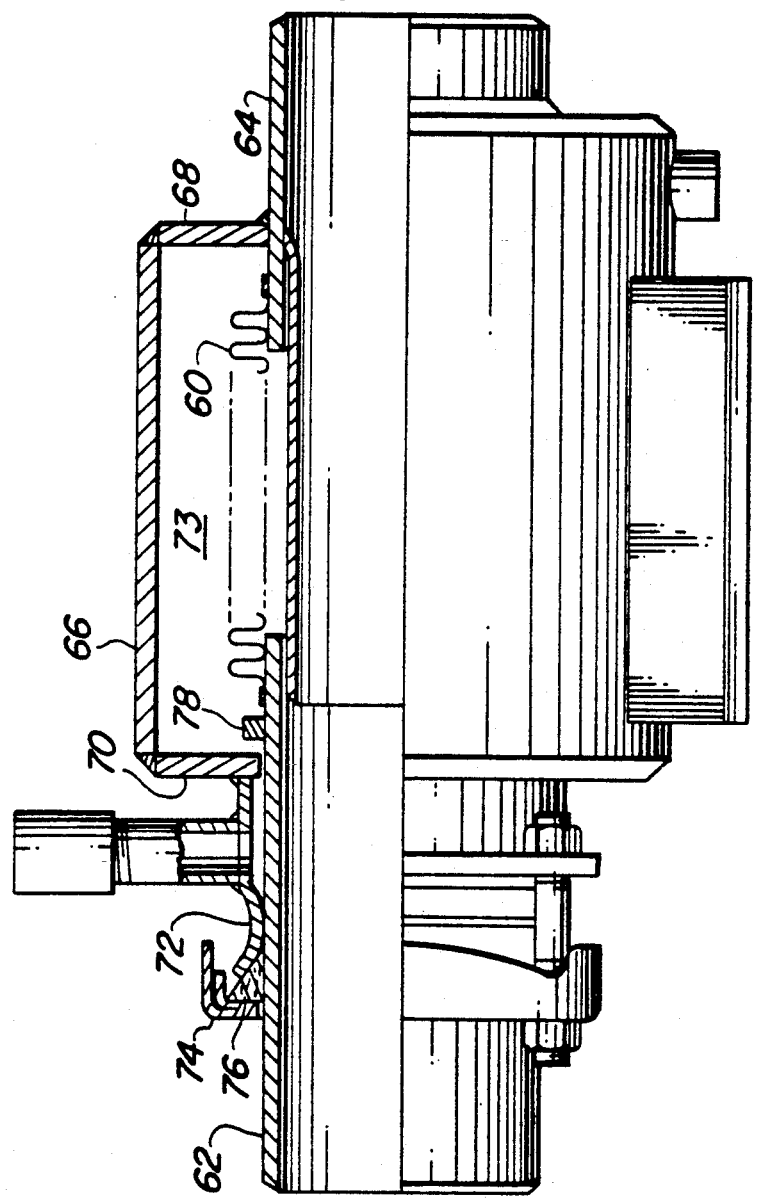
FIG. 3 is a split section view of an alternate expansion joint arrangement of this invention.

This invention is more fully described in the context of the arrangements shown in FIGS. 1-3. The description of this invention in the context of these particular arrangements is not meant to limit the invention to the particular details shown therein.

FIGS. 1 and 2 illustrate an expansion joint arranged in accordance with this invention. The expansion joint has a sealing element in the form of a corrugated bellows 10. Welded attachment bars at a first attachment point 12 and a second attachment point 14 positively attach the opposite ends of the bellows 10 to a first expansion joint conduit, in the form of pipe section 16, that extends from a first end 17 of the expansion joint and a second expansion joint conduit, in the form of a pipe section 18, that extends from a second end 19 of the expansion joint and is longitudinally aligned with the first conduit. Thus, bellows 10 provides a sealed containment for the piping system between the two conduits of the expansion joint. The conduits are shown with beveled ends 17 and 19 for attachment to the piping system; however, the ends of the pipe can be attached to the piping system using any acceptable method including flanges or couplings. Any type of flexible sealing element can be used in place of bellows 10, so long as the sealing element is a continuous member that can be integrally attached to the expansion joint conduits and permits relative movements between its ends while imposing relatively small displacement forces at its attachment points. Particular details of bellows construction such as number of plies, ply thickness, number of convolutions or corrugations, bellows material, etc. can be determined for the particular piping system in question by ordinary methods well known to those skilled in the art.

The bellows 10 of FIG. 1 is arranged to operate with piping pressure on the outside of the bellows. Pressure on the outside of the bellows is usually the preferred arrangements since such pressure loading adds substantial strength to the bellows. The externally pressurized expansion joint arrangement, as depicted in FIG. 1, attaches the first expansion joint conduit (pipe section 16) to the far end of the bellows at attachment point 14 and the second conduit to the relatively farthest end of the bellows, attachment point 12. In order to attach the conduits to the relatively farthest ends of the bellows, each expansion joint conduit must extend axially past each other over the entire length of the bellows. The conduits are extended past the bellows and each other by using different sized conduits. For this purpose the entire length of one conduit may be made relatively larger. Alternatively, FIG. 1 shows pipe section 18 having a large diameter sleeve 20 that surrounds bellows 10 and the distal end of pipe section 16. An annular ring 22 attaches sleeve 20 to pipe 18. Another annular ring 24 connects the distal end of sleeve 20 to a sleeve 26 located between bellows 10 and expansion joint end 17. Yet another sleeve section 28 extends from annular ring 24 towards bellows 10 which is attached thereto at point 12. Pipe section 16 extends inwardly underneath bellows 10. An annular ring 30 radiates outwardly from the end of pipe section 16. A pipe sleeve 32 extends toward bellows 10 from ring 30. Sleeve 32 provides a surface for attachment point 14 of bellows 10.

In addition to the first sealing element (bellows 10), the expansion joint uses a second sealing element. The second sealing element provides a sliding seal that permits relative movement between the conduits of the expansion joint. In its presently contemplated form this sliding seal comprises packing that seals a continuous gap between a segment of the first conduit and a segment of the second conduit. The first and second conduits can be arranged to place this gap at any location along the length of the expansion joint. FIG. 1 shows a gap 33 between pipe section 16 and sleeve 26. Those skilled in the art can readily envision arrangements for placing the gap in other locations. One such arrangement would replace sleeve 20 with an overlapping sleeve arrangement, having a gap somewhere in its middle, by varying the diameters of the two sleeve sections which would replace sleeve 20 to provide overlapping and attaching the end of each sleeve to a different conduit of the expansion joint.

The packed type sliding seal can use any suitable combination of packing material, packing arrangement and sleeve surface that will provide an acceptable seal. In general the seal material is selected based on piping temperature and the chemical environment in and around the piping. In a particularly preferred arrangement of the sliding seal, the packing comprises a graphite material and a chrome plating will cover the section of the pipe that contacts the packing. A variety of different packing geometries and packing containment arrangements can be used. For example square or rectangular packing arrangements can be used in place of the wedge type packing shown in the Figures. Furthermore, it is also well known that the packing material can be held in place by containment devices such as snap rings and threaded connections instead of the bolted ring as illustrated by the Figures.

Looking more specifically to the arrangement of FIG. 1, sleeve portion 26 cooperates with a collar 34 to retain packing material 36 at the end of sleeve 26 and form the second seal between sleeve 26 and pipe section 16. In order to restrict the size of gap 33, sleeve 26 has an inner diameter that is only slightly greater than the outer diameter of pipe 16. Usually this gap has a width that is greater than 0 and less than ⅛ of an inch. Packing 36 provides a sliding seal that permits movement of pipe sleeve 16 relative to sleeve 26. The sliding seal can also be designed to permit relative angular displacements. This angular displacement capacity permits the expansion joint of this invention to accommodate some degree of angular displacement across the expansion joint ends. In most cases this angular displacement will be less than about 4° and preferably less than ½°.

The packed seal is not affected by vibration or cycling in the same way as the flexible seal or expansion joint that forms the first seal. Therefore, as previously mentioned it is unlikely that both the flexible sealing element and the packed seal will fail at the same time or that the packed seal would fail catastrophically.

Drawing collar 34 towards sleeve 26 squeezes the packing material 36 against pipe sleeve 16 to provide the sliding seal. In the embodiment of FIG. 1, a set of four bolts pass through collar 34 and a retaining ring 40. Tightening the nuts on bolts 38 pulls ring 34 toward sleeve 26 to compress packing 36. The arrangement of sleeve 26, collar 34 and bolts 38 are readily obtained by splitting a standard compression pipe coupling such as a "Dresser Coupling".

The expansion joint can also be provided with a means to detect leakage across the flexible sealing element or bellows. One such arrangement senses pressure in a chamber formed at least in part by the flexible sealing element the first conduit, the second conduit and the packed seal. In FIG. 1 this chamber is indicated by number 42 and formed by pipe 16; bellows 10; sleeves 26, 28, and 32, and packing 36. A pressure tap 44 located on sleeve 26 communicates with chamber 42 across sleeve 26. By establishing a reference pressure in chamber 42 and using pressure tap 44 to monitor any fluctuation in the reference pressure, any leakage across the expansion joint can be detected. Pressure tap 44 can also be used to supply a gas to chamber 42 thereby controlling the environment in chamber 42 and, in particular, the exposure of the bellows to corrosive environments.

Another chamber 46 is formed to the outside of the bellows. Chamber 46 is defined by ring 22; sleeves 28, 32, and 20; bellows 10; and a sleeve 48. The distal end of pipe 16 overlaps internal sleeve 48 that extends from the attachment point of ring 22 to pipe 18. Chamber 46 communicates with the fluid in the pipe system across a gap 50 between pipe 16 and internal sleeve 48. A drain fitting 52 provides an outlet for purging chamber 46 and withdrawing any accumulated moisture from the low point of the expansion joint that collects on the inside of sleeve 20. As can be seen ring 30 divides the volume of chamber 46 into a region 46 and 46'. The bottom of the expansion joint also includes an external support 59 for anchoring the piping system.

Ring 30 is also arranged to act in conjunction with a radially extending, torsional stop 54 which prevents relative rotation of the expansion joint ends and protects the bellows against torsional loads. For this purpose ring 30 has a slot 56 that receives the radially extending stop 54 and allows only axial movement of stop 54 relative to ring 30.

The expansion joint arrangement of FIG. 1 also provides for stops that limit the extension and contraction of the expansion joint. An extension stop 58 prevents overextension of the expansion joint (which in the arrangement of FIG. 1 can cause overcompression of the bellows) by contacting the inner end of ring 24 when the expansion joint reaches its predetermined limit on axial extension. Overcompression of the expansion joint, and the resulting extension of the bellows, can be prevented by incorporating an appropriate stop at the end of torsional stop 54 that is opposite bellows 10 or by the contact of ring 30 with ring 22.

FIG. 3 depicts another arrangement of the expansion joint of this invention wherein the pressure from the piping act against the interior of a bellows 60 having one end attached to a pipe section 62 and the other end attached to a pipe section 64. A sleeve 66 together with rings 68 and 70 form a chamber 73 that surrounds bellows 60. A small diameter sleeve section 72 is attached at the inner circle of ring 70 and together with a collar 74 and packing 76 forms a sliding seal with pipe 62. In all other respects the arrangement of FIG. 3 acts in essentially the same manner as the apparatus described in FIG. 1.

In the operation of either expansion joint the sliding or packed seal provides a prophylactic function until bellows 10 or 60 fails. Accordingly only the minimum expected sealing pressure need be applied to packing 36 or 76 when the expansion joint is first installed and while the flexible seal or bellows remains intact. Maintaining a low sealing pressure on the packing minimizes the break-away force that the packed seal imposes on the piping system. Should the bellows fail, the packing will either completely prevent any escape of fluid from the expansion joint or permit only a small amount of leakage across the gap. If any minor leakage is objectionable, the sealing pressure on the packing can be increased as necessary to stop such leakage. Of course, where large break-away forces pose no problems for the piping system, a high sealing pressure can be initially applied to the packed seal to eliminate the possibility of expansion joint leakage in the event of a later bellows failure. Whether used with high or low sealing pressure, the second seal and its packed arrangement provides a useful safeguard against catastrophic bellows failure.

I claim:

1. An expansion joint comprising:
a first conduit extending from a first end of said joint;
a second conduit longitudinally aligned with said first conduit, extending from a second end of said joint and having an overlapping portion that surrounds said first conduit to form an annular opening between said first conduit and said second conduit;
a flexible sealing element having a first end fixed to said first conduit and a second end fixed to said second conduit;
a secondary seal for sealing said annular opening and permitting relative movement between said first conduit and aid second conduit, said secondary seal comprising a wedge shaped packing comprising a graphite material, a flared sleeve portion of said second conduit adapted to receive said wedge shaped packing, a collar for urging said wedge shaped packing toward said sleeve, and a chrome plated portion of said first conduit in contact with said graphite packing for relative sliding movement therewith, said wedge shaped packing forming a seal between said first conduit and said flared portion of said second conduit, and;
means for urging said collar toward said flared sleeve portion, said wedge shaped packing, said flared sleeve portion and said chrome plating providing said expansion joint with a low break away force and low sliding friction.

2. The expansion joint of claim 1 wherein said flexible sealing element comprising a corrugated bellows.

3. The expansion joint of claim 1 wherein said second conduit and said sleeve portion define a chamber in communication with said packing and said expansion joint includes means for sensing pressure within said chamber.

4. The expansion joint of claim 1 wherein said sleeve portion is located proximate said first end of said expansion joint.

5. The expansion joint of claim 1 wherein an end stop is fixed to at least one of said first and second conduits to restrict relative axial movement between first and second conduits.

6. The expansion joint of claim 1 wherein the minimum diameter of said flared sleeve portion defines a minimum gap between said sleeve and said first conduit of less than ⅛".

7. An expansion joint comprising:
a first conduit extending from a first end of said joint;
a second conduit aligned with said first conduit and extending from a second end of said joint;
an external sleeve fixed to said second conduit and surrounding said first conduit to define an annular opening;
a first means for sealing comprising a corrugated bellows having a first end proximate said first end of said joint and a second end proximate said second end of said joint, wherein said second end of said bellows is fixed to said first conduit and said first end of said bellows is fixed to said sleeve;
a secondary seal for sealing said annular opening comprising a wedge shaped packing consisting of a graphite material, a flared portion of said sleeve adapted to receive said packing, and a collar for urging said wedge shaped packing toward said sleeve;
a chrome plated portion of said first conduit in contact with said graphite packing for relative sliding movement therewith, and;
means for urging said collar toward said sleeve to provide a seal between said first conduit and said flared portion of said second conduit, and said wedge shaped packing, said flared sleeve portion and said chrome plating providing said expansion joint with a low break away force and low sliding friction.

8. The joint of claim 7 wherein said annular opening is proximate said second end of said joint.

9. The joint of claim 7 wherein said joint has means for sensing pressure between said first means for sealing and said secondary seal.

10. The joint of claim 9 wherein said means for sensing pressure comprises a pipe fitting located on said sleeve.

11. An expansion joint for piping systems having a protected bellows element said joint comprising:
a first conduit extending from a first end of said joint;
a second conduit coaxially aligned with said first conduit and extending from a second end of said joint;
an external sleeve fixed to said second conduit and surrounding said first conduit, said sleeve having a first section and a second section defining an annular space with said first conduit wherein said first section has a larger diameter than said second section and said second section having a flared end adapted to receive a wedge shaped packing;
a corrugated bellows located in said annular space between said first section of said external sleeve and said first conduit and having a first end proximate said first end of said joint and a second end proximate said second end of said joint, wherein said second end of said bellows is fixed to said first conduit and said first end of said bellows is fixed to said first section of said sleeve;
a chamber defined at least in part by the inside of said bellows, the outside of said first conduit and the inside of said second section of said sleeve;
a wedge shaped packing, consisting of a graphite material forming a seal between said flared end and said first conduit, a chrome plating on the portion of said first conduit that contacts said packing to provide said expansion joint with a low break away force and low sliding friction, and a collar for urging said packing toward said sleeve to seal said chamber; and,
means for urging said collar toward said sleeve.

12. The expansion joint of claim 11 wherein an end stop is fixed to at least one of said first and second conduit to restrict relative axial movement between said first and second conduits.

* * * * *